United States Patent [19]

Miller

[11] Patent Number: 5,675,427
[45] Date of Patent: Oct. 7, 1997

[54] ELECTRONIC DEVICE REMOTE CONTROL WITH SIGHTING MECHANISM

[76] Inventor: Johnny D. Miller, 500 Wall Blvd. #86, Gretna, La. 70056

[21] Appl. No.: 571,389

[22] Filed: Dec. 13, 1995

[51] Int. Cl.$^6$ .................................................. H04B 10/00
[52] U.S. Cl. .................... 359/142; 359/146; 359/147; 340/825.72; 348/734; 455/151.2; D14/218
[58] Field of Search .............. D14/218; 348/734; 455/93, 95, 352, 353, 354, 355, 151.2; 359/142, 147, 148, 146; 341/176; 340/825.72

[56] References Cited

U.S. PATENT DOCUMENTS

| | | | |
|---|---|---|---|
| D. 328,463 | 8/1992 | King et al. | D14/217 |
| D. 331,058 | 11/1992 | Morales | D14/218 |
| D. 344,952 | 3/1994 | Bartholomew | D14/218 |
| 3,906,369 | 9/1975 | Pitman et al. | 325/111 |
| 5,253,068 | 10/1993 | Crook et al. | 348/734 |

*Primary Examiner*—Kinfe-Michael Negash
*Attorney, Agent, or Firm*—Joseph N. Breaux

[57] ABSTRACT

An electronic device remote control of the type having electronic control circuitry controlling an infrared transmitter, housed by a handgun shaped housing having a handle portion having a control circuitry chamber sized to house the control circuitry, and a barrel portion, extending from the handle portion at an angle of between seventy-five and one-hundred-five degrees. The barrel portion has a handgun sighting mechanism including a rear sight and a front sight for allowing a user to aim the transmitter of the remote control at the receiving unit of the controlled device. The remote control also includes a visible light emitting source extending from the muzzle end of the barrel portion. The visible light source is preferably powered from a separate power source.

17 Claims, 1 Drawing Sheet

ELECTRONIC DEVICE REMOTE CONTROL WITH SIGHTING MECHANISM

TECHNICAL FIELD

The present invention relates to remote controls for electronic devices, such as televisions and stereos, and more particularly to infrared LED type remote controls for electronic devices, such as televisions and stereos, that have an aiming mechanism for aiming the transmitting infrared LED at the infrared receiver.

BACKGROUND ART

Infrared type remote control transmitters are a very common method for allowing users to control various aspects of consumer electronic devices such as stereos, televisions and video tape recorders. These consumer electronic devices are commonly operated in dark or dimly lit conditions. Under such dark or dimly lit conditions, it is often a problem to locate and aim the remote control at the particular device to be controlled. It would be a benefit, therefore, to have a remote control device having a distinctive shape that allowed a user to correctly identify the direction in which the transmitting LED of the remote control transmitter was directed solely by touching and/or feeling the housing of the remote control. It would be a further benefit, when viewing or listening under normal lighting conditions, to have an aiming mechanism for aiding the user in aiming the output of the remote control transmitter at the receiver of the electronic device to aid users having a remote control transmitter with low batteries. Because the user often listens or watches these electronic devices under dark or dimly lit conditions, it would be a benefit if the remote control transmitter included a flashlight feature that could be utilized for reading viewing and listening guides or for finding new musical and video selections for future play.

GENERAL SUMMARY DISCUSSION OF INVENTION

It is thus an object of the invention to provide an electronic device remote control having a shape that allows a user to correctly identify the direction in which the transmitting LED of the remote control transmitter is aimed solely by feeling the housing of the remote control.

It is a further object of the invention to provide an electronic device remote control that includes an aiming mechanism for aiding the user in aiming the output of the remote control transmitter at the receiver of the electronic device.

It is a still further object of the invention to provide an electronic device remote control that includes a flashlight feature.

It is a still further object of the invention to provide an electronic device remote control that accomplishes all or some of the above objects in combination.

Accordingly, an improved electronic device remote control of the type having electronic control circuitry controlling an infrared transmitter, the circuitry causing the infrared transmitter to transmit predetermined signals to an electronic device having a receiving unit in response to actuation of one of a plurality of control buttons, the control buttons including a button for each of the following functions: volume-up, volume-down, channel-up, channel-down, on/off, and mute; is provided. The improvement comprises: a handgun shaped housing having a handle portion having a control circuitry chamber sized to house the control circuitry; and a barrel portion, extending from the handle portion at an angle of between seventy-five and one-hundred-five degrees. The barrel portion has a battery chamber formed therein for housing at least one battery for supplying electrical power to the control circuitry; a handgun sighting mechanism including a rear sight and a front sight; an infrared transmitter extending from a muzzle end thereof; an electrically powered visible light emitting source extending from the muzzle end and positioned adjacent the infrared transmitter, a first pivoting trigger mechanism including an electrical contact in electrical connection with the control circuitry and functioning as the control button for the channel up & down function, extending from the barrel into an area defined by a trigger guard; a second pivoting trigger mechanism adjacent to the first trigger mechanism including a electrical contact in electrical connection with the control circuitry and functioning as the control button for the volume up & down function, extending from the barrel into an area defined by a trigger guard; and a light control switch in electrically controlling connection with the visible light emitting source.

The mute button and the on/off button are, preferably, all arranged along one side of the barrel portion of the gun. In addition, it may be desirable to provide housing compartment space and electrical connections for a second battery, and connections between the visible light emitting source and the electrical connections of the second battery so that use of the visible light emitting source will not effect the power source providing power to the control circuitry. The first and second pivoting trigger mechanism are preferably aligned in tandem. In addition, the barrel portion preferably includes indicia located adjacent the control buttons that indicate to a user the function of the adjacent control button.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
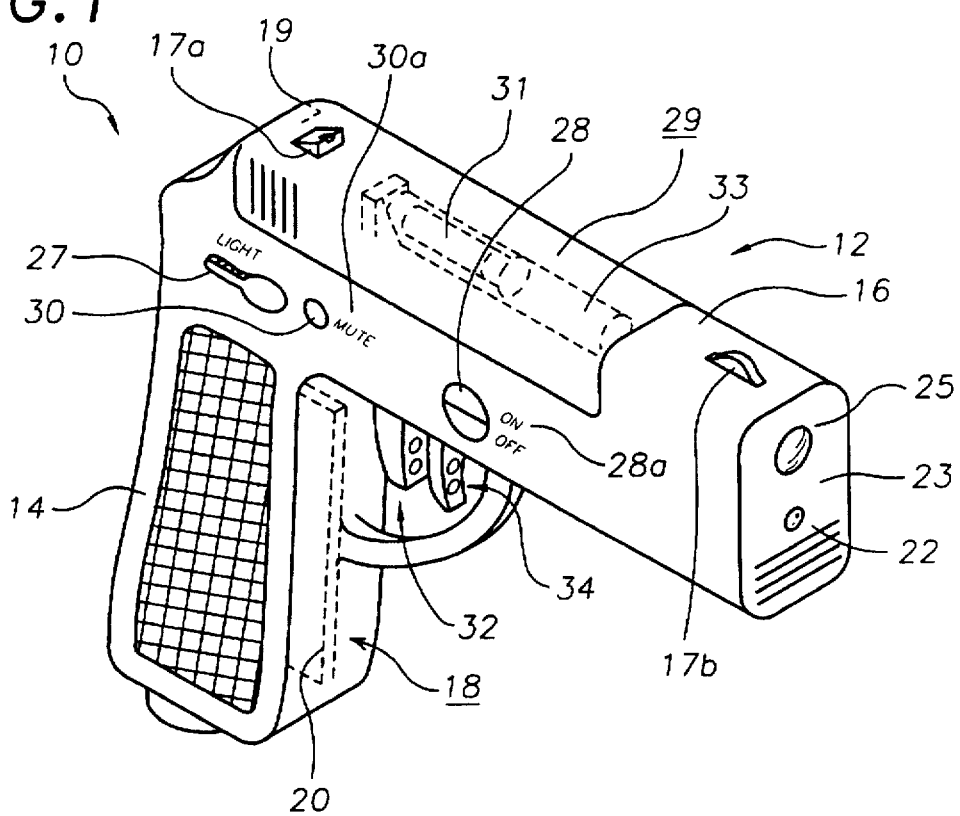
FIG. 1 is a perspective view of an exemplary pistol shaped embodiment of the improved electronic remote control device of the present invention showing the sighting assembly including the front and rear sights.

FIG. 1 shows an exemplary remote control with sighting device of the present invention generally designated by the numeral 10. Remote control 10 includes a pistol shaped housing, generally designated by the numeral 12, having a handle portion 14; and a barrel portion 16 having a notched rear sight 17a and a front sight 17b positioned along a top surface 19 and a longitudinal axis thereof. A control circuitry chamber 18 is provided in handle portion 14. The control circuitry 20 for controlling the remote control transmitter and the various functions of remote control 10 is disposed within circuitry chamber 18. In this embodiment, control circuitry 20 is a conventional remote control circuitry of the type well known to those practiced in the art of remote control transmitters. Control circuitry 20 controls an infrared LED 22, and causes infrared LED 22 to transmit predetermined infrared signals in response to actuation of one of a plurality of control switches. LED 22 is positioned on the muzzle end 23 of barrel portion 16 and directs infrared light in a direction indicated by a line drawn between rear and front sights 17b,17a. This allows rear and front sights 17b,17a to be utilized for aiming remote control 10 at the receiving unit of the electronic device being controlled and results in more responsive remote controlling with weak batteries.

A visible light emitting diode 25 is located adjacent infrared LED 22. Visible light emitting diode 25 is electrically controlled by a light switch 27 provided on the side of barrel portion 16. A battery compartment 29 is provided within barrel portion 16 that has battery connections for a first battery 31 that supplies power to control circuitry 20 and a second battery 33 that supplies power to visible light emitting diode 25.

In this embodiment the control buttons include an on/off button switch 28; a mute button switch 30; a channel up & down trigger switch mechanism, generally designated by the numeral 34; and a volume up & down trigger switch mechanism, generally designated by the numeral 32. Switches 24, 26, 28, and 30 are conventional momentary contact switches.

On/off button switch 28, and mute button switch 30 are located on the same side and spaced sufficiently to allow easy touch identification thereof. In addition, a visual indicium 28a, 30a is formed on barrel portion 16 adjacent on/off button switch 28, and mute button switch 30, respectively.

Figure 2:
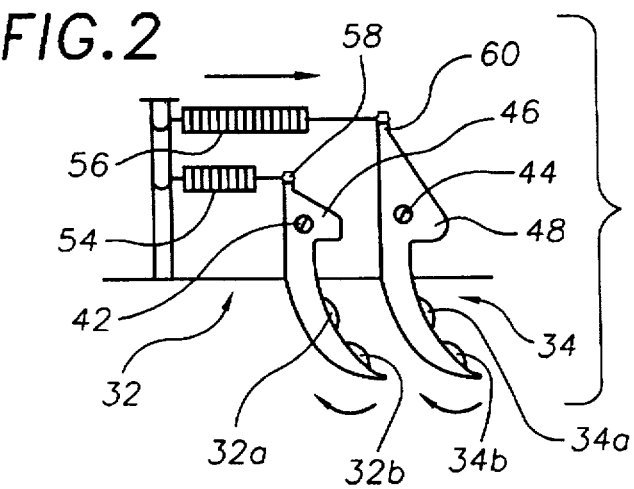
FIG. 2 is a detail plan view of the first and second pivoting trigger mechanisms showing the biasing springs and the momentary contact electrical switches actuated by squeezing the trigger of each trigger mechanism.

With reference to FIG. 2, channel up & down trigger switch mechanism 34 includes an up membrane switch 34a and a down membrane switch 34b. Volume up & down trigger switch mechanism 32 includes an up volume membrane switch 32a and a down volume membrane switch 32b.

Each trigger switch mechanism 32,34 includes a pivot pin 42,44 upon which a trigger member 32c,34c pivots. Each trigger member 32c,34c includes a pivoting portion 46,48 that allows the trigger member to be squeezed during use. A biasing spring 54,56 is secured to a spring tab 58,60 to bias trigger member 32c,34c, respectively in a desired direction. Each of the membrane switches 32a,32b,34a,34b is a momentary contact membrane switch of the type described below and referenced as a contact switch 50.

Figure 3:
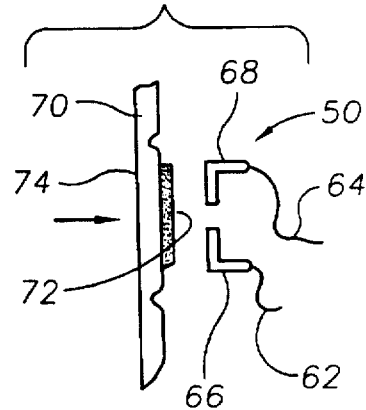
FIG. 3 is a detail plan view of a preferred momentary contact membrane switch showing a section of resilient sheeting, a carbon impregnated electrically conductive rubber button, and two electrical contacts that are electrically connected when simultaneously contacted by the rubber button.

FIG. 3 shows a schematic representation of a contact switch 50. Each contact switch 50 includes a first and second connecting wire 62,64 connected to a first and second electrode 66,68; a resilient membrane 70 and a carbon impregnated electrically conductive contact button 72. Switch 50 is activated by applying a force against an outer surface 74 of resilient membrane 70 bringing contact button 72 simultaneously into contact with and allowing electrical flow between first and second electrodes 66,68. Once the force is removed, the resiliency of resilient membrane 70 biases contact button 72 away from first and second electrodes 66,68 breaking electrical flow therebetween.

Operation and use of remote control 10 is now describe with general reference to FIGS. 1-3. Remote control 10 is used by aligning rear and front sights 17a,17b and the receiving unit of the device being controlled and actuating the desired function button switch 24,26,28,30; or trigger switch mechanism 32,34. If it is desired to utilize the light source feature, such as for reading a television guide, remote control 10 may be grasped and aimed at the television guide either before or after activating light switch 27.

It can be seen from the preceding description that an electronic device remote control has been provided that has a shape that allows a user to correctly identify the direction in which the transmitting LED of the remote control transmitter is aimed solely by feeling the housing of the remote control; that includes an aiming mechanism for aiding the user in aiming the output of the remote control transmitter at the receiver of the electronic device; and that includes a flashlight feature.

It is noted that the embodiment of the remote control described herein in detail for exemplary purposes is of course subject to many different variations in structure, design, application and methodology. In particular although the housing of the exemplary embodiment of the remote control is shown in the shape of a pistol, it is noted specifically herein that the housing can take the form of any type of handgun as for instance a musket pistol or revolver. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An improved electronic device remote control of the type having electronic control circuitry controlling an infrared transmitter, the control circuitry causing the infrared transmitter to transmit predetermined signals to an electronic device having a receiving unit in response to actuation of one of a plurality of control buttons, said control buttons including a button for each of the following functions: volume-up, volume-down, channel-up, channel-down, on/off, and mute; said improvement comprising:

a handgun shaped housing having:
    a handle portion having a control circuitry chamber sized to house said control circuitry formed therein; and
    a barrel portion, extending from said handle portion at an angle of between seventy-five and one-hundred-five degrees and having said infrared transmitter extending from a muzzle end thereof, said barrel portion further including:
    a battery chamber formed therein for housing at least one battery for supplying electrical power to said control circuitry,
        a handgun sighting mechanism including a rear sight and a front sight,
        an electrically powered visible light emitting source extending from said muzzle end and positioned adjacent said infrared transmitter,
    a first pivoting trigger mechanism including a first electrical contact switch in electrical connection with said control circuitry and functioning as said control button for said channel up function, and a second electrical contact switch in electrical connection with said control circuitry and functioning as said control button for said channel down function;
    a second pivoting trigger mechanism adjacent to said first trigger mechanism including a third electrical contact switch in electrical connection with said control circuitry and functioning as said control button for said volume up function, and a fourth electrical contact switch in electrical connection with said control circuitry and functioning as said control button for said volume down function, and
    a light control switch in electrically controlling connection with said visible light emitting source.

2. The remote control of claim 1, wherein:

said mute button and said on/off button are arranged along one side of said barrel portion housing.

3. The remote control of claim 2, further including:

electrical connections for a second battery power source, and wherein:
said housing includes sufficient housing compartment space to house a second battery power source, and
said visible light emitting source and said light switch are in a circuit with said electrical connections in a manner such that said second battery supplies the visible light emitting source.

4. The remote control of claim 3 wherein:

said first and second pivoting trigger mechanism each include a trigger member, and
said trigger members are aligned in tandem.

5. The remote control of claim 4 wherein:

a plurality of indicium, each being formed on said barrel portion adjacent one of said control buttons and providing an indication to a user the function of the said control button to which each said indicium is adjacent.

6. The remote control of claim 2 wherein:

said first and second pivoting trigger mechanism each include a trigger member, and
said trigger members are aligned in tandem.

7. The remote control of claim 6 wherein:

a plurality of indicium, each being formed on said barrel portion adjacent one of said control buttons and providing an indication to a user the function of the said control button to which each said indicium is adjacent.

8. The remote control of claim 2 wherein:

a plurality of indicium, each being formed on said barrel portion adjacent one of said control buttons and providing an indication to a user the function of the said control button to which each said indicium is adjacent.

9. The remote control of claim 8, further including:

electrical connections for a second battery power source, and wherein:
said housing includes sufficient housing compartment space to house a second battery power source, and
said visible light emitting source and said light switch are in a circuit with said electrical connections in a manner such that said second battery supplies the visible light emitting source.

10. The remote control of claim 1, further including:

electrical connections for a second battery power source, and wherein:
said housing includes sufficient housing compartment space to house a second battery power source, and
said visible light emitting source and said light switch are in a circuit with said electrical connections in a manner such that said second battery supplies the visible light emitting source.

11. The remote control of claim 10 wherein:

said first and second pivoting trigger mechanism each include a trigger member, and
said trigger members are aligned in tandem.

12. The remote control of claim 11 wherein:

a plurality of indicium, each being formed on said barrel portion adjacent one of said control buttons and providing an indication to a user the function of the said control button to which each said indicium is adjacent.

13. The remote control of claim 10 wherein:

a plurality of indicium, each being formed on said barrel portion adjacent one of said control buttons and providing an indication to a user the function of the said control button to which each said indicium is adjacent.

14. The remote control of claim 1 wherein:

said first and second pivoting trigger mechanism each include a trigger member, and
said trigger members are aligned in tandem.

15. The remote control of claim 14 wherein:

a plurality of indicium, each being formed on said barrel portion adjacent one of said control buttons and providing an indication to a user the function of the said control button to which each said indicium is adjacent.

16. The remote control of claim 1 wherein:

a plurality of indicium, each being formed on said barrel portion adjacent one of said control buttons and providing an indication to a user the function of the said control button to which each said indicium is adjacent.

17. An improved electronic device remote control of the type having electronic control circuitry controlling an infrared transmitter, the control circuitry causing the infrared transmitter to transmit predetermined signals to an electronic device having a receiving unit in response to actuation of one of a plurality of control buttons, said control buttons including a button for each of the following functions: volume-up, volume-down, channel-up, channel-down, on/off, and mute; said improvement comprising:

a handgun shaped housing having:
a handle portion having a control circuitry chamber sized to house said control circuitry formed therein; and
a barrel portion, extending from said handle portion at an angle of between seventy-five and one-hundred-five degrees and having said infrared transmitter extending from a muzzle end thereof, said barrel portion further including:
a battery chamber formed therein for housing at least one battery for supplying electrical power to said control circuitry,
a handgun sighting mechanism including a rear sight and a front sight,
an electrically powered visible light emitting source extending from said muzzle end and positioned adjacent said infrared transmitter,
a first pivoting trigger mechanism including a first trigger member biased by a first biasing spring, said first trigger member having a first and a second electrical contact switch positioned thereon, said first electrical contact switch being in electrical connection with said control circuitry and functioning as said control button for said channel up function, said second electrical contact switch being in electrical connection with said control circuitry and functioning as said control button for said channel down function;
a second pivoting trigger mechanism positioned adjacent to said first trigger mechanism, said second pivoting trigger mechanism including a second trigger member biased by a second biasing spring, said second trigger member including a third and a fourth electrical contact switch positioned thereon, said third electrical contact switch being in electrical connection with said control circuitry and functioning as said control button for said volume up function, said fourth electrical contact switch being in electrical connection with said control circuitry and functioning as said control button for said volume down function, and
a light control switch in electrically controlling connection with said visible light emitting source.

* * * * *